United States Patent Office 3,027,233
Patented Mar. 27, 1962

3,027,233
PROCESS FOR THE PRODUCTION OF ALUMINA FROM ALUMINUM SULFATE
Edward Michalko, Chicago, Ill., assignor to Universal Oil Products Company, Des Plaines, Ill., a corporation of Delaware
No Drawing. Filed Aug. 13, 1959, Ser. No. 833,405
1 Claim. (Cl. 23—143)

The present invention relates to a method for manufacturing alumina, and is particularly directed toward an improvement in the process of manufacturing alumina which process involves the utilization of aluminum sulfate as the source thereof. In these processes, ammonium hydroxide is generally used in admixture with the aluminum sulfate to obtain a precipitate of insoluble aluminum hydroxide which, upon drying and/or calcining, is transformed into alumina.

Alumina, in its many anhydrous forms, as aluminum oxide hydrate, or as aluminum hydroxide, is widely used in chemical and petroleum industries. Alumina is employed as a catalyst in and of itself, and quite often serves as a carrier material for various catalytic components. Alumina is often employed as a dehydrating, treating or purifying agent. Various physical modifications of one of the previously mentioned forms of alumina result in an alumina which is commonly referred to as "activated alumina," having an especially desired type of catalytic activity and a high degree of adsorptive capacity. Alumina is very stable up to temperatures of about 1800° F. or more and, in view of this physical property, finds widespread use as a special type of refractory material. For many other uses, alumina is often combined with other refractory inorganic oxides such as silica, magnesia, thoria, boron oxide, zirconia, etc. and mixtures of the same, all of which possess certain desired physical characteristics. Whatever its intended use, however, it is necessary that the alumina be substantially pure and especially free from contaminants which, if present, might induce adverse effects toward any of the functions previously described.

One of the first commercial methods for the manufacture of alumina involved the recovery of aluminum oxide from naturally occurring clays and earths. This method involved a long, arduous process, and produced a comparatively low-grade alumina which was relatively expensive. Many investigations have since been conducted in regard to manufacturing processes for the purpose of producing a relatively inexpensive, high-purity alumina. Precipitation methods have been studied whereby a weak alkaline material such as an aqueous solution of ammonium hydroxide, is added to an aqueous solution of an aluminum salt to form a precipitate of alumina. However, due to certain physical characteristics imparted to the resulting alumina, and which inherently result from the use of ammonium hydroxide in reaction with some aluminum salts, the precipitate thus formed is difficult to convert to a form which is suitable for any of the functions previously described. In consequence, other, more expensive, alkaline materials must be employed as precipitants and the precipitation methods therefore become difficult to justify economically. In addition, even though the alkaline precipitant may be suitable, not all of the salts of aluminum are advantageously employed. For example, when aluminum sulfate, which is readily obtainable at low cost, is employed as the source of aluminum, the gelatinous precipitate resulting from the utilization of ammonium hydroxide, is notoriously difficult to process to its final form. Washing to remove various contaminants is extremely tedious, and although washing by filtration is used, relatively long periods of time are required to produce an acceptable filter cake which can be dried readily, and formed into the desired shape, and/or further treated for use as a carrier material for catalytically active components. Other difficulties, arising as a result of employing aluminum sulfate as the source of aluminum, are hereinafter set forth.

Conventional methods for precipitating aluminum hydroxide from aluminum sulfate, involve the procedure of adding an aqueous solution of one compound to a vessel containing a large supply of the other compound. For example, in this manner, an aqueous solution of ammonium hydroxide is added to a vessel which contains a large amount of an aqueous solution of aluminum sulfate, thereby precipitating the aluminum hydroxide. However, the pH, during this precipitation procedure, either starts at a low level and increases, or starts at a high level and slowly decreases. The resulting precipitate has an extremely low solids content, usually not in excess of about 11.0% to 12.0% by weight, and is very difficult to wash because of its inherently poor filtration characteristics. The final filter cake is made up of large agglomerate particles resulting from the varying high and low localized pH levels during the precipitation procedure, and is effectively contaminated by the retention of an excessive quantity of sulfate ions. In addition, the filter cake is non-homogeneous in regard to composition, particle to particle, as well as non-uniform with respect to each individual particle.

At least a portion of the foregoing difficulties appear to be readily overcome by the precipitation method in which the pH level of the precipitation mixture is maintained at a constantly acidic level throughout the period of intermixing, as well as during the ensuing formation of aluminum hydroxide. A dense, granular precipitate is obtained which has a relatively high solids content upon filtering—usually about 12.0% to about 15.0% by weight. The resulting filter cake, although more easily obtained, because of the increased granular character of the precipitate, continues to be relatively concentrated in sulfate ions which are difficult to remove without resorting to tedious, expensive procedures which nullify the economic benefits derived through the use of aluminum sulfate. Also, there still exists the tendency for the formation of relatively large agglomerate particles, in turn leading to non-homogeneity.

The object of the present invention is to produce alumina from aluminum sulfate, which alumina is of uniform particle size, substantially free from contaminating sulfate ions, and which is prepared by a process avoiding arduous, expensive procedures. The method of the present invention utilizes a constantly acidic pH precipitation, within the range of 5.5 to 6.5, to produce a uniform, insoluble basic aluminum sulfate, and employs a particular combination of urea with the enzyme urease for the purpose of neutralizing the precipitated basic aluminum sulfate prior to obtaining the filter cake, which, upon drying and/or calcining, yields the finished alumina.

Therefore, in its most broad embodiment, the present invention provides an improvement in the process of manufacturing alumina from aluminum sulfate, in which process aluminum sulfate is commingled with ammonium hydroxide to form insoluble aluminum hydroxide containing large, gelatinous non-homogeneous agglomerate particles which, upon filtering, produces a filter cake of low solids content, which improvement comprises simultaneously commingling an aqueous solution of aluminum sulfate with an aqueous solution of ammonium hydroxide at a constantly acidic pH, forming thereby insoluble basic aluminum sulfate, commingling the resultant basic aluminum sulfate with an aqueous solution of urea containing the enzyme urease, filtering the resulting alumina slurry and recovering a filter cake without large agglomerate particles and having a high solids content.

In another embodiment, the present invention relates to an improvement in the process of manufacturing alumina from aluminum sulfate, in which process aluminum sulfate is commingled with ammonium hydroxide to form insoluble aluminum hydroxide containing large, gelatinous non-homogeneous agglomerate particles which, upon filtering, produces a filter cake of low solids content, which improvement comprises simultaneously commingling aqueous solutions of aluminum sulfate and ammonium hydroxide, maintaining the pH of the resulting mixture acidic and within the range of about 5.5 to about 6.5, commingling the resulting insoluble basic aluminum sulfate with an aqueous solution of urea containing the enzyme urease in an amount of from about 1% to about 10% by weight, based upon the quantity of urea, filtering the resulting alumina slurry and recovering a filter cake without large agglomerate particles and having a high solids content.

The most specific embodiment of the present invention yields an improvement in the process of manufacturing alumina from aluminum sulfate, in which process the aluminum sulfate is commingled with ammonium hydroxide to form insoluble aluminum hydroxide containing large, gelatinous non-homogeneous agglomerate particles which, upon filtering, produces a filter cake of low solids content, which improvement comprises simultaneously commingling aqueous solutions of aluminum sulfate and ammonium hydroxide, maintaining the pH of the resulting mixture acidic and within the range of about 5.5 to about 6.5, commingling the resulting insoluble basic aluminum sulfate, at a temperature within the range of from about 65° F. to about 120° F., with an aqueous solution of urea containing the enzyme urease, said urea being of an amount to yield a weight ratio of alumina equivalent ($Al_2O_3$), in the basic aluminum sulfate, to urea of from about 1.5:1 to about 3.5:1 and containing from about 1% to about 10% by weight of the enzyme urease, filtering the resulting alumina slurry and recovering a filter cake without large agglomerate particles and having a solids content in excess of about 17.5% by weight. In the present specification, and appended claims, the term "alumina equivalent" is designated to mean that quantity of aluminum oxide ($Al_2O_3$) which would result if all the aluminum existing as basic aluminum sulfate were converted thereto. The "alumina equivalent" is employed as a convenient means of calculating the actual quantity of urea which is used in a given instance.

As hereinbefore set forth, the improvement which comprises the essence of the present invention takes advantage of the benefits afforded through the utilization of a constantly acidic pH level during the commingling of the ammonium hydroxide with the aluminum sulfate, and preferably, an acidic pH which is controlled at a level of 6.0, not being permitted to vary below 5.5, or above 6.5. By this procedure, basic aluminum sulfate is produced having an aluminum to sulfate weight ratio of about 1.35. At this stage, the insoluble basic aluminum sulfate precipitate is still too difficult to produce in the form of a filter cake having a high solids content. Aqueous solutions of ammonium hydroxide and aluminum sulfate are employed for the precipitation of basic aluminum sulfate, and any suitable concentrations of known pH value may be used. Solutions of about 15% to about 40% by weight will facilitate the handling and metering of the solutions, as well as ease in control of the pH of the precipitating mixture. The solutions are simultaneously added to any suitable vessel containing a mechanism for mixing, and which is equipped with suitable means for determining the pH of the resulting mixture, and controlling the latter by adjusting the rates of addition of either and/or both the aqueous solutions of ammonium hydroxide and aluminum sulfate. A sufficiently small amount of aluminum sulfate solution is added to a small amount of water to bring the initial contents of the vessel to the desired pH level of 6.0. The solutions of ammonium hydroxide and aluminum sulfate are then simultaneously added, and the rates of either or both are continuously adjusted to maintain the pH of the mixture at the level of the initial contents of the vessel. When the desired quantity of basic aluminum sulfate has been precipitated, the addition of both the aluminum sulfate and ammonium hydroxide is stopped.

The basic aluminum sulfate, produced by the constantly acidic pH within the range of about 5.5 to about 6.5, is commingled with an aqueous solution of urea containing minor quantities of the enzyme urease. I employ a single filtration step for the sole purpose of concentrating the basic aluminum sulfate free from the accompanying precipitating solution. I have found that the addition of urea to the basic aluminum sulfate effects the substantially complete neutralization thereof through the decomposition of the urea into ammonia and carbon dioxide. Such decomposition, essential for complete neutralization to yield an aluminum hydroxide free from sulfate ions, generally requires elevated temperatures in excess of about 200° F. At these temperatures, however, there exists the tendency for the mixture of urea and aluminum sulfate, to set suddenly into a solid gelatinous mass containing the neutralized aluminum hydroxide. This gelatinous mass, being a mixture of aluminum hydroxide and ammonium sulfate, suffers from inherent difficulties subsequently encountered in further processing to produce an alumina acceptable for use as hereinbefore set forth. In accordance with my invention, the solution of urea, employed for the neutralization of the basic aluminum sulfate precipitate, contains minor quantities of the enzyme urease. Urease serves to catalyze the decomposition of the urea, and does so at temperature levels below which the gelatinous mass is formed. The neutralized precipitate is obtained in a form which is very easily filtered to yield a homogeneous filter cake substantially free from sulfate ions, and containing a high concentration of solids, without the production of relatively large agglomerates.

The filter cake produced from the method of the present invention, upon drying and calcining, results in talc-like alumina having a particle size of about 5–10 microns. As such, the alumina may be formed into any desirable shape such as pills, tablets, cake, extrudates, etc., or, the alumina may be redissolved for the purpose of subsequently forming the same into hydrogel spheroids by the well-known oil-drop method. When the alumina is to be employed as a carrier material for the manufacture of catalytic composites, it may be impregnated with the desired catalytically active components, such as metals and non-metals including halides, oxides and sulfides, either before or after the alumina has been formed into the desired shape. The talc-like alumina particles, being substantially completely free from surface ions, and having a particle size of about 5–10 microns, are of particular benefit when employed as an inexpensive binding agent in the manufacture of white rubber.

As hereinbefore set forth, the use of the sulfate of aluminum was not heretofore economically justified due to the poor quality of the alumina so produced. Aluminum sulfate is, however, one of the more abundant compounds of aluminum and, therefore, the present invention has the economical advantage afforded through its use. The sulfate may be obtained from any suitable source, being either naturally occurring or synthetically produced. At the present time, a large source of relatively pure aluminum sulfate is available as a by-product from many of the processes designed to recover the catalytically active metal components from alumina base catalysts, for example, by extraction of the alumina in these catalysts with sulfuric acid. It is not intended, however, to limit the present invention to this particular source of aluminum sulfate.

Briefly, the preferred method for effecting the formation of alumina from aluminum sulfate consists of precipitating basic aluminum sulfate at a constantly acidic pH level within the range of 5.5 to 6.5. That is, the precipitation is controlled at a pH level of 6.0, and is not permitted to vary without the stated limits. The resulting basic aluminum sulfate is recovered in the form of a filter cake by a single washing via filtration. An aqueous solution of urea (25.4 grams of urea per 100 ml.) is added to the filter cake in an amount to yield a weight ratio of the alumina equivalent, within the basic aluminum sulfate, to urea in the range of about 1.5:1 to about 3.5:1, to insure complete neutralization of the basic aluminum sulfate. In order to prevent the formation of a solid gelatinous mass, it is essential to the present invention that the aqueous solution of urea contain a minor quantity of the enzyme urease. Based upon the amount of urea necessarily employed to result in complete neutralization of the basic aluminum sulfate, the enzyme urease is present in a concentration within the range of about 1% to about 10% by weight. The aqueous solution of urea and the filter cake are intimately commingled to produce a slurry of finely-divided, neutralized aluminum hydroxide. There exists no need to raise the temperature of the slurry in order to effect the decomposition of the urea, for the decomposition is catalyzed by the urease; further, the formation of the gelatinous mass is effectively inhibited. The decomposition of urea may be effected at temperatures below about 120° F., and within the range of 65° F to 120° F., to insure complete neutralization without the formation of large agglomerates of the solid gelatinous mass. The resulting slurry is then filtered and washed, the filter cake being recovered without large, non-homogeneous agglomerates, substantially free from sulfate ions, and containing in excess of 17.5% by weight of solid material.

Upon drying, at a temperature of from about 100° C. to about 400° C., the alumina is in the form of talc-like powder having a particle size of about 5–10 microns. The alumina may be subjected to a high-temperature calcination, usually effected at a level of 400° C. to about 800° C., and in the presence of a free-oxygen containing atmosphere such as air. In those instances where the alumina is to be formed into some other shape, the calcination may be conveniently postponed until the alumina exists in its ultimate form.

The following examples are presented to illustrate further the novelty and utility of the method of the present invention: It is not intended to limit unduly the present invention to the conditions and/or concentrations employed within the examples.

*Example I*

An aqueous solution of 28% by weight ammonium hydroxide, having a pH of 12.8, in an amount of about 60 milliliters was placed in a glass beaker. An aqueous solution of 28% by weight of aluminum sulfate (having a pH of about 3.3) was added until the pH of the resulting mixture attained a level of 8.0, at which time the addition of the aluminum sulfate solution was stopped. The resulting precipitate, insoluble aluminum hydroxide, was filtered from the accompanying solution by pouring the slurry onto a filter paper in a Buchner funnel, and applying suction to the filter flask. The filter cake, collected on the filter paper, was thereafter washed with 700 milliliters of hot water, containing one milliliter of 28% by weight ammonium hydroxide, while the filter cake was retained in the funnel and while suction was continuously applied to the filter flasks. The solids content of the filter cake, after this initial washing step was only 9.0% by weight. Nine additional washing steps were required before the filtrate indicated a negative test for sulfate ions. During the last 4 of the 9 washing treatments, the rate of filtration was extremely slow, and the final filter cake indicated a solids content of only 14.0% by weight.

This example illustrates the difficulty encountered in washing and filtering the aluminum hydroxide precipitate when the pH of the amomnium hydroxide-aluminum sulfate mixture is not constantly maintained acidic, and within a particular range. The difficulty experienced in obtaining the filter cake is attribtuted to the formation of large, non-homogeneous agglomerates, resulting from the localized, and varying, high and low pH levels during the addition of the aluminum sulfate to the ammonium hydroxide.

*Example II*

50 milliliters of water were placed in a glass beaker to which was added about 3 milliliters of a 28% by weight solution of aluminum sulfate (having a pH of 1.5). The pH of the resulting solution was adjusted to a level of 6.0 by adding thereto a sufficient quantity of an aqueous solution of 28% by weight ammonium hydroxide (having a pH of 12.8). The aqueous solutions of aluminum sulfate and ammonium hydroxide were then added continuously and simultaneously at such rates as to maintain the pH of the resulting reaction mixture at about 6.0. The addition was continued until a total of 2 gallons of the aluminum sulfate solution had been added. The approximate rates of addition were 1200 milliliters of aluminum sulfate solution per hour and 420 milliliters of the ammonium hydroxide solution per hour. 150 grams of the resulting basic aluminum sulfate precipitate, resulting from the foregoing constantly acidic precipitation was commingled with 20 milliliters of an aqueous solution of urea containing 25.4 grams of urea per 100 milliliters, and about 0.5 gram of the enzyme urease. The resulting mixture was stirred gently for 4 hours, at room temperature of about 80° F., and subsequently filtered. The filter cake contained 20.7% by weight of solid material, which upon drying at a temperature of 150° C., produced a talc-like powder having an average size of 5 to 10 microns.

*Example III*

A second portion of basic aluminum sulfate was obtained via a precipitation effected by simultaneously commingling ammonium hydroxide and aluminum sulfate at a pH which was constantly controlled at a level of 6.0, at no time varying outside the range of 5.5 to 6.5. The basic aluminum sulfate was removed from the resulting slurry by filtration, and reslurried to a total weight of 7000 grams. The resulting slurry contained 6.27% by weight of aluminum and 5.43% by weight of sulfate ions. To a 1116 gram portion of this slurry was added 200 ml. of an aqueous solution of urea containing 25.4 grams of urea per 100 ml., and 0.50 gram of the enzyme urease. The basic aluminum sulfate-urea mixture was stirred for a period of about 4 hours, at room temperature, after which time the mixture was subjected to filtration on a Buchner funnel. There was obtained 667 grams of filter cake having a solids content of 19.8% by weight. Upon drying, there resulted a talc-like alumina powder having a particle size of about 5–10 microns.

The foregoing examples clearly illustrate the benefits afforded through the utilization of the present invention. The precipitation of a basic aluminum sulfate at a constantly acidic pH, rather than the precipitation of aluminum hydroxide at a varying pH, followed by the addition of urea in combination with the enzyme urease, has resulted in a filter cake free from large, non-homogeneous agglomerates, and possessing a substantially increased solids content. In addition, the filter cake is substantially free from sulfate ions without the necessity of excessive washing procedures. Lastly, upon drying the filter cake, there is produced an alumina of talc-like fineness, having a particle size of about 5 to 10 microns. The difficulties heretofore encountered in the manufacture of alumina, employing ammonium hydroxide and aluminum sulfate, have been overcome by the method of the present invention to a distinct economical advantage.

I claim as my invention:

A process of manufacturing alumina from aluminum sulfate, which comprises simultaneously commingling aqueous solutions of aluminum sulfate and ammonium hydroxide, maintaining the pH of the resulting mixture acidic and within the range of about 5.5 to about 6.5, separating the resultant insoluble basic aluminum sulfate from the liquid and commingling the same, at a temperature within the range of from about 65° F. to about 120° F., with an aqueous solution of urea containing from about 1% to about 10% by weight of the enzyme urease, said urea being in an amount to yield a weight ratio of alumina equivalent within said basic aluminum sulfate to urea of from about 1.5:1 to about 3.5:1, filtering the resulting alumina slurry and recovering a filter cake without large agglomerate particles and having a solids content in excess of about 17.5% by weight.

References Cited in the file of this patent

UNITED STATES PATENTS

| | | |
|---|---|---|
| 1,015,499 | Langlet et al. | Jan. 23, 1912 |
| 1,337,192 | Buchner | Apr. 20, 1920 |
| 1,386,920 | Buchner | Aug. 9, 1921 |
| 2,798,050 | Gladrow et al. | July 2, 1957 |
| 2,867,588 | Keith et al. | Jan. 6, 1959 |
| 2,898,306 | Cramer et al. | Aug. 4, 1959 |

OTHER REFERENCES

Karrer, P.: "Organic Chemistry," 2nd ed., Elsevier Publ. Co., Inc., New York, 1946, pages 218.